United States Patent
Cahen et al.

(10) Patent No.: US 9,357,872 B2
(45) Date of Patent: Jun. 7, 2016

(54) LIQUID FOOD OR BEVERAGE MACHINE WITH COMBINABLE ACCESSORIES

(75) Inventors: Antoine Cahen, Lausanne (CH); Stefan Kaeser, Aarau (CH); Alexandre Kollep, Lutry (CH); Frank Kräuchi, Epautheyres (CH); Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 577 days.

(21) Appl. No.: 12/747,820

(22) PCT Filed: Dec. 9, 2008

(86) PCT No.: PCT/EP2008/067077
§ 371 (c)(1),
(2), (4) Date: Aug. 11, 2010

(87) PCT Pub. No.: WO2009/074555
PCT Pub. Date: Jun. 18, 2009

(65) Prior Publication Data
US 2010/0300301 A1 Dec. 2, 2010

(30) Foreign Application Priority Data

Dec. 12, 2007 (EP) ..................................... 07123009

(51) Int. Cl.
*A47J 31/40* (2006.01)
*A47J 31/44* (2006.01)
(Continued)

(52) U.S. Cl.
CPC .......... *A47J 31/4403* (2013.01); *A47J 31/4421* (2013.01); *A47J 31/4485* (2013.01); *A47J 31/18* (2013.01); *A47J 31/46* (2013.01);
(Continued)

(58) Field of Classification Search
CPC .. B65D 85/8043; A47J 31/52; A47J 31/4485; A47J 31/057; A47J 31/005; A47J 31/46
USPC ......... 99/295, 280, 323.1, 300, 279, 290, 293
See application file for complete search history.

(56) References Cited

U.S. PATENT DOCUMENTS 2,927,533 A 3/1960 Luehrs
3,218,955 A * 11/1965 Lorang ........................... 99/282
(Continued)

FOREIGN PATENT DOCUMENTS

AT 410377 4/2003
AU 99855 S 3/1988
(Continued)

OTHER PUBLICATIONS

U.S. Appl. No. 12/747,684 Non-Final Office Action dated Mar. 11, 2013.
(Continued)

*Primary Examiner* — Dana Ross
*Assistant Examiner* — Hemant Mathew
(74) *Attorney, Agent, or Firm* — Winston & Strawn LLP (57) ABSTRACT

A device for preparing a liquid food or beverage having an outermost housing with faces that are arranged to shield at least part of a liquid food or beverage module. A face of the housing has a connection to an appliance. This face is arranged to support mechanically such an appliance. The connection is disconnectably connectable by a user to the appliance. The housing is so arranged that the appliance is removably mountable onto the housing face by a user.

18 Claims, 4 Drawing Sheets

(51) Int. Cl.
  *A47J 31/18*  (2006.01)
  *A47J 31/52*  (2006.01)
  *A47J 31/46*  (2006.01)

(52) U.S. Cl.
  CPC .............. *A47J 31/52* (2013.01); *A47J 2201/00* (2013.01); *Y10T 29/49826* (2015.01)

(56) References Cited

U.S. PATENT DOCUMENTS

| | | | |
|---|---|---|---|
| 3,938,492 A | 2/1976 | Mercer, Jr. | |
| 4,054,085 A * | 10/1977 | Tarr | 99/284 |
| 4,164,306 A | 8/1979 | Perrin | |
| 4,253,385 A | 3/1981 | Illy | 99/281 |
| 4,377,049 A | 3/1983 | Simon et al. | 40/465 |
| 4,389,925 A | 6/1983 | Piana | |
| 4,458,735 A | 7/1984 | Houman | 141/95 |
| 4,554,419 A | 11/1985 | King et al. | 200/5 |
| 4,681,495 A | 7/1987 | Crespin et al. | 411/298 |
| 4,757,753 A | 7/1988 | Pandolfi | |
| 4,767,632 A | 8/1988 | Meier | 426/231 |
| 4,829,888 A * | 5/1989 | Webster et al. | 99/284 |
| 4,892,031 A * | 1/1990 | Webster et al. | 99/284 |
| 4,954,697 A | 9/1990 | Kokubun et al. | 235/381 |
| 5,036,998 A | 8/1991 | Dunn | |
| 5,161,455 A * | 11/1992 | Anson et al. | 99/280 |
| 5,193,701 A | 3/1993 | Bush et al. | |
| 5,312,020 A | 5/1994 | Frei | 222/129.1 |
| 5,335,705 A | 8/1994 | Morishita et al. | 141/275 |
| 5,353,692 A | 10/1994 | Reese et al. | 99/289 |
| 5,372,061 A | 12/1994 | Albert et al. | 99/281 |
| 5,375,508 A | 12/1994 | Knepler et al. | 99/280 |
| 5,498,757 A * | 3/1996 | Johnson et al. | 426/520 |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,855,161 A | 1/1999 | Cortese | |
| 5,890,615 A | 4/1999 | Petras | |
| 5,916,351 A | 6/1999 | Sintchak | |
| 5,927,553 A | 7/1999 | Ford | 222/129.4 |
| 5,959,869 A | 9/1999 | Miller et al. | 364/479.01 |
| 5,992,298 A | 11/1999 | Illy et al. | |
| 6,029,562 A * | 2/2000 | Sintchak | 99/275 |
| 6,062,127 A | 5/2000 | Klosinski et al. | 99/303 |
| 6,123,010 A | 9/2000 | Blackstone | 99/284 |
| 6,182,555 B1 | 2/2001 | Scheer et al. | 99/290 |
| 6,213,336 B1 | 4/2001 | Lin | |
| 6,325,312 B1 * | 12/2001 | Karkos, Jr. | 241/100 |
| 6,345,570 B1 | 2/2002 | Santi | |
| 6,354,341 B1 | 3/2002 | Saveliev et al. | 141/94 |
| 6,582,002 B2 | 6/2003 | Hogan et al. | |
| 6,759,072 B1 | 7/2004 | Gutwein et al. | 426/433 |
| 6,843,667 B2 * | 1/2005 | Khoury | A47J 27/2105 219/432 |
| 7,028,603 B1 | 4/2006 | Gremillion et al. | 99/290 |
| 7,093,533 B2 | 8/2006 | Tebo, Jr. et al. | |
| 7,210,401 B1 | 5/2007 | Rolfes et al. | 99/289 |
| 7,270,050 B2 | 9/2007 | Glucksman et al. | 99/297 |
| 7,279,660 B2 | 10/2007 | Long et al. | 219/441 |
| 7,350,455 B2 | 4/2008 | Vetterli | 99/280 |
| 8,695,484 B2 | 4/2014 | Mori | |
| 8,800,433 B2 | 8/2014 | Cahen et al. | |
| 2002/0185016 A1 | 12/2002 | Hoffjann et al. | |
| 2003/0070555 A1 | 4/2003 | Reyhanloo | 99/282 |
| 2004/0015263 A1 | 1/2004 | Chadwell et al. | 700/216 |
| 2005/0015263 A1 | 1/2005 | Beal et al. | 705/1 |
| 2005/0258186 A1 | 11/2005 | Hart et al. | |
| 2007/0056994 A1 | 3/2007 | Woodnorth et al. | |
| 2007/0062378 A1 | 3/2007 | Glucksman et al. | |
| 2007/0157820 A1 | 7/2007 | Bunn | 99/275 |
| 2007/0175338 A1 | 8/2007 | Glucksman et al. | |
| 2009/0101021 A1 | 4/2009 | Tonelli et al. | 99/290 |
| 2009/0173235 A1 | 7/2009 | Kollep et al. | 99/279 |
| 2010/0251900 A1 | 10/2010 | Cahen et al. | 99/323.1 |
| 2010/0263543 A1 | 10/2010 | Krauchi et al. | 99/280 |
| 2010/0263547 A1 | 10/2010 | Cahen et al. | 99/300 |
| 2010/0263550 A1 | 10/2010 | Cahen et al. | 99/323.1 |
| 2011/0041698 A1 | 2/2011 | Mori | 99/290 |

FOREIGN PATENT DOCUMENTS

| | | | |
|---|---|---|---|
| AU | 312567 S | 1/2007 | |
| CH | 682 798 | 11/1993 | |
| CH | EP 1859713 A1 * | 11/2007 | ......... A47J 31/3633 |
| CN | 2235252 Y | 9/1996 | |
| CN | 1209041 A | 2/1999 | |
| CN | 2387836 | 7/2000 | |
| CN | 2682954 Y | 3/2005 | |
| CN | 1875831 | 12/2006 | |
| DE | 44 29 353 | 2/1996 | |
| DE | 20 2006 002 124 | 5/2006 | |
| DE | 20 2006 019 039 | 4/2007 | |
| DE | 102006060748 | 1/2008 | |
| EP | 0 549 887 | 7/1993 | |
| EP | 0 838 186 | 4/1998 | |
| EP | 08155753.0 | 7/2003 | |
| EP | 1 440 639 | 7/2004 | |
| EP | 1 448 084 | 8/2004 | |
| EP | 1 676 509 | 7/2006 | |
| EP | 1 707 088 | 10/2006 | |
| EP | 1 731 065 | 12/2006 | |
| EP | 1772081 A1 | 4/2007 | |
| EP | 1 798 457 | 6/2007 | |
| EP | 1 859 713 | 11/2007 | |
| EP | 08155851.2 | 11/2007 | |
| EP | 1 864 598 | 12/2007 | |
| EP | 1 867 260 | 12/2007 | |
| EP | 1 878 368 | 1/2008 | |
| EP | 2 070 454 | 6/2009 | |
| FR | 2 440 720 | 11/1979 | |
| FR | 2 544 185 A3 | 10/1984 | |
| FR | 2 554 185 | 5/1985 | |
| FR | 2 624 844 | 6/1989 | |
| FR | 2648695 A1 | 12/1990 | |
| GB | 2 397 510 | 7/2004 | |
| GB | 2 421 423 | 6/2006 | |
| JP | 50054990 A | 5/1975 | |
| JP | 51135081 U | 11/1976 | |
| JP | 52138542 U | 10/1977 | |
| JP | 54065788 U | 5/1979 | |
| JP | 55-128626 U1 | 9/1980 | |
| JP | S59174120 A | 10/1984 | |
| JP | 61119218 A | 6/1986 | |
| JP | 62-100138 U | 6/1987 | |
| JP | H0638880 A2 | 2/1994 | |
| JP | 11253330 A2 | 9/1999 | |
| JP | 2001222761 A | 8/2001 | |
| JP | 2002191505 A | 7/2002 | |
| JP | 2004527893 A | 9/2004 | |
| JP | 2006341097 A | 12/2006 | |
| LU | 85318 | 9/1984 | |
| RU | 1797482 A3 | 2/1993 | |
| RU | 2294875 C2 | 3/2007 | |
| WO | WO97/24052 | 7/1997 | |
| WO | WO 97/25634 | 7/1997 | |
| WO | WO 99/50172 | 10/1999 | |
| WO | WO01/52704 A1 | 7/2001 | |
| WO | WO 02/059534 | 8/2002 | |
| WO | WO02/070371 A2 | 9/2002 | |
| WO | WO 02/097927 | 12/2002 | |
| WO | WO02097927 A1 | 12/2002 | |
| WO | WO 02097927 A1 * | 12/2002 | |
| WO | WO 03039309 | 5/2003 | |
| WO | WO 03/075629 | 9/2003 | |
| WO | WO 03/093142 A1 | 11/2003 | |
| WO | WO 2004/030435 | 4/2004 | |
| WO | WO 2004/030438 | 4/2004 | |
| WO | WO 2005/099535 | 10/2005 | |
| WO | WO 2006/050900 | 5/2006 | |
| WO | WO 2006/063645 | 6/2006 | |
| WO | WO 2006/082064 | 8/2006 | |
| WO | WO 2006/090183 | 8/2006 | |
| WO | WO 2006/122916 | 11/2006 | |
| WO | WO 2007/003062 | 1/2007 | |

(56) References Cited

FOREIGN PATENT DOCUMENTS

| WO | WO 2007/003990 | 1/2007 |
|----|----------------|--------|
| WO | WO 2007/141334 | 12/2007 |
| WO | WO 2008/046837 | 4/2008 |
| WO | WO 2008/104751 | 9/2008 |
| WO | WO 2008/138710 | 11/2008 |
| WO | WO 2008/138820 | 11/2008 |
| WO | WO 2011/092644 | 8/2011 |

OTHER PUBLICATIONS

International Search Report, PCT/EP2008/067072, mailed Oct. 9, 2009.
International Search Report, PCT/EP2008/067075, mailed Aug. 27, 2009.
International Search Report, PCT/EP2008/067077, mailed Oct. 14, 2009.
International Search Report, PCT/EP2008/067079, mailed Apr. 9, 2009.
International Search Report, PCT/EP2008/067083, mailed Apr. 16, 2009.
U.S. Appl. No. 12/747,743, Non-Final Office Action, dated Apr. 11, 2013.
U.S. Appl. No. 12/988,295, Non-Final Office Action, dated May 6, 2013.
U.S. Appl. No. 12/747,794, Final Office Action, dated Jun. 6, 2013.
European Search Report, Application No. EP 10167803 mailed Aug. 27, 2010.
U.S. Appl. No. 12/747,841, Non-Final Office Action, dated Dec. 18, 2012.
U.S. Appl. No. 12/988,295, Restriction Requirement, dated Aug. 16, 2012.
U.S. Appl. No. 12/747,794, Non-Final Office Action, dated Jan. 30, 2013.
Page 66 of the official Diary of Chile listing CL 3721-08 (corresponding to US 2010/0263543A1) dated Jan. 8, 2010.
Chilean Search Report for CL 3720-08 dated Feb. 7, 2011 (corresponding to US 2010-0263547A1).
CL-2023-07 cited in Chilean Search Report, CL 3720-08 dated Feb. 7, 2011 (corresponding to US 2009-0173235A1).
U.S. Appl. No. 12/747,684 Non-Final Office Action, May 27, 2014.
Japanese Office Action, Application No. P2013-170594, dated Jun. 24, 2014 with English translation for relevant portion(s) of JP references JP62100138 and JP55128626.
U.S. Appl. No. 12/747,841, Final Office Action, dated May 13, 2013.
U.S. Appl. No. 12/988,295, Final Office Action dated Jul. 24, 2013.
U.S. Appl. No. 12/747,841, Advisory Action, dated Jul. 26, 2013.
U.S. Appl. No. 12/747,743, Non-Final Office Action dated Sep. 25, 2013.
U.S. Appl. No. 12/747,684, Final Office Action, dated Jul. 30, 2013.
P007910120—Kaffeevollautomatern Magnifica II—ESAM 300 B—Mar. 12, 2007.
U.S. Appl. No. 12/747,684, Advisory Action, dated Nov. 13, 2013.
U.S. Appl. No. 12/988,295, Notice of allowance dated Dec. 2, 2013.
U.S. Appl. No. 12/747,743 Notice of Allowance and Fees Due (PTOL-85) dated Apr. 2, 2014.
U.S. Appl. No. 12/747,794 Non-Final Office Action, Jul. 29, 2014.
U.S. Appl. No. 12/747,841 Non-Final Office Action, Jul. 22, 2014.

\* cited by examiner

LIQUID FOOD OR BEVERAGE MACHINE WITH COMBINABLE ACCESSORIES

This application is a 371 filing of International Patent Application PCT/EP2008/067077 filed Dec. 9, 2008.

FIELD OF THE INVENTION

The field of the invention pertains to beverage machine arranged for combination with further appliances.

BACKGROUND ART

Certain beverage or food preparation machines use capsules containing ingredients to be extracted or to be dissolved; for other machines, the ingredients are stored and dosed automatically in the machine or else are added at the time of preparation of the drink.

Most coffee machines possess within a housing: filling means that include a pump for liquid, usually water, which pumps the liquid from a source of water that is cold or indeed heated through heating means, such as a heating resistor, a thermoblock or the like.

EP 1 864 598 discloses such a coffee machine that is autonomous and that can be mounted onto a docking station. The beverage machine is arranged to be operable whether connected to the docking station or disconnected therefrom.

EP 1 878 368 discloses a beverage machine having a functional block in a housing that is rotatably mounted on a support base. The support base has a power connector for the beverage machine that allows such rotation. The functional block can be designed to be removable from the support base. The support base may have an extension with a power connector for mounting a milk-frothing apparatus thereon.

FR 2 544 185 discloses an old espresso machine in which a hot water, a steam preparation module and a plurality of different coffee preparation modules may be mechanically and electrically connected side-by-side. The aim is to provide a system with a sufficient number of parallel coffee outlets, as required for the normal use in a bar so as to permit preparation of several espressos simultaneously.

There is still a need to increase the versatility of liquid food or beverage machines.

SUMMARY OF THE INVENTION

It is a preferred object of the present invention to provide a liquid food or beverage preparation device with a simple arrangement for allowing a user to add or substitute various side-functions that are nevertheless convenient for a user of such a device in relation with a liquid food or a beverage.

The invention thus relates to a device for preparing a liquid food or beverage, in particular from a pre-portioned beverage or food ingredient such as an ingredient contained in a capsule or pod.

The device comprises an outermost housing having faces that are arranged to shield at least part of a liquid food or beverage module arranged for receiving an ingredient and feeding a liquid to the ingredient. Typically, a food or beverage outlet of the module will extend outside the housing, whereas substantially all the remaining parts of the module will be included within the housing.

For instance, the device is a coffee, tea or soup preparation machine. In particular, the device is arranged for preparing within the liquid food or beverage module a beverage or liquid food by passing hot or cold water or another liquid through a capsule or pod containing an ingredient of the beverage or liquid food to be prepared, such as ground coffee or tea or chocolate or cacao or milk powder.

In according with the invention, one of the faces of the housing has means for connection to an appliance. This housing face with the connection means is arranged to support mechanically such an appliance. Moreover, the connection means is disconnectably connectable by a user to this appliance. The housing is so arranged that such an appliance is removably mountable onto the housing face with the connection means by a user.

Typically, this appliance is functionally independent from the liquid food or beverage module. For example, if the module is arranged for the preparation of coffee or tea, the appliance may be arranged to preheat cups or prepare frothed milk or hot or boiling water.

The connection means may in particularly be of the cordless type. For example, the connection means includes a STRIX™ system or another plug and socket connector system or an equivalent system.

In one embodiment, the housing has a foot part forming a platform that bears the housing face with the connection means. Optionally, the liquid food or beverage module generally extends upwards, within the housing, adjacent a first edge of the platform, the housing face with the connection means being generally located adjacent a second edge of the platform, such as a second edge opposite to the first edge. The housing with its platform may have a generally L-shaped or an inverted T-shaped cross-section.

Such a platform normally includes a power supply arrangement for the liquid food or beverage module. The platform may include at least one of a control system, a pump, a heater and a piping arrangement for circulating liquid, in particular from a reservoir of liquid external to the outermost housing.

In another embodiment, the housing has a top part, in particular above the liquid food or beverage module, that forms the face with the connection means.

Moreover, the housing typically has a rear wall adjacent a liquid reservoir external to the outermost housing. The reservoir is usually in fluid communication with the liquid food or beverage module and may be mechanically mounted against the rear wall and/or, when present, onto a platform of the device. Typically, the fluid connection between the reservoir and the module extends through the platform of the housing, when present. The liquid reservoir can have one or more reservoir walls which is/are generally flush with the housing sidewalls, in particular an upright semi-circular reservoir wall having extremities that are generally flush with the housing sidewalls.

Such appliance disconnectably connectable to the liquid food and beverage device may typically be selected from a milk frother, a kettle 8b and a cup heater.

For instance, such an appliance is a handle-free milk frother that has a tank for containing milk to be frothed and an outer generally upright surface forming a grip arrangement that is seizable by a human hand. Hence such an appliance can be held and lift single-handed by seizure of this grip arrangement. In particular, the outer surface, for instance the surface of an outer container of the appliance, has a textured outer upright wall to improve hand-holding thereof, in particular an undulated or corrugated upright surface. The presence of generally horizontally extending parallel, alternating ridges and grooves on the upright surface improves significantly the gripping of the appliance for lifting, holding and manipulation thereof. To allow comfortable holding, single-handed, of the appliance, the diameter of the gripping part may be of the order of 4 to 15 cm, in particular 6 to 12 cm.

The housing face with the connection means may support a first removable appliance, such as a cup heater, that has: a first connector disconnectably connectable to the connection means of the housing face; and a second connector that is disconnectably connectable to a second appliance, such as a milk frother or kettle. This second appliance is optionally disconnectably connectable directly to the connection means of this housing face in the absence of the first removable appliance.

The housing face with the connection means may have a first portion for supporting such a connectable appliance and a second portion that is arranged for supporting one or more cups and that may be associated with a cup preheating means.

Another aspect of the invention relates to a set that comprises a liquid food and beverage device as described above and a plurality of different appliances. the device has connection means and the appliances are disconnectably connectable to such connection means.

A further aspect of the invention concerns a cup heater, in particular for the liquid food or beverage device or for the set described above. The cup heater has a cordless connector.

The cup heater may have at least one heatable platform for holding and preheating a plurality of cups. The cup heater may have a plurality of stacked platforms, the stacked platforms being optionally electrically interconnected and/or individually activatable for heating cups.

The cup heater may have a seat for holding a cup, the seat having in particular at least one peripheral wall for confining heat against such a cup. Optionally, the peripheral wall has an opening for allowing the passage of the handle of such cup to facilitate its removal from the cup heater.

Furthermore, the invention also relates to a milk frothing appliance that has a tank for containing milk to be frothed, in particular an appliance for a device or a set described above. This milk frothing appliance is handleless and has an outer generally upright surface that forms a grip arrangement seizable by a human hand, such that the appliance can be carried and displaced single handed by seizure of said grip arrangement. The frothing appliance has in particular a cordless connector for connection to a corresponding connection means of a liquid food or beverage device or a support base.

Preferably, such a grip should be arranged so that the entire weight of the appliance may be supported by this grip without risk of damage or deformation of the appliance, as might for instance happen if the user involuntarily drops the appliance. The grip should also extend over a sufficient height and the circumference of the grip should be adapted to the shape and capacity of a normal human hand to allow a firm seizure by the hand, sufficient for the user to safely carry the appliance with all its weight. Optionally, the grip arrangement includes a means, such as a surface structure or composition, in particular an anti-skid surface that provides friction against a human hand to reduce the necessary gripping force needed to achieve a reliable gripping.

Typically, the upright surface has a portion that is textured or striated to facilitate hand gripping. The portion may have a generally upright corrugation or undulation to facilitate hand gripping.

The milk frothing appliance may also comprise an agitator for agitating milk in said tank and an actuator for actuating said agitator. Optionally, this agitator comprises a wisk or stirrer and/or this actuator is located in a housing that contains the tank and the actuator adjacent to one another. The surface with the grip arrangement may in particular form an outer surface of this housing.

Hence, the milk frothing appliance of the invention provides a simple gripping arrangement for the user to lift and/or displace the appliance, without the need of a handle connected to the appliance. This gripping arrangement may result directly from an appropriate shape of the appliance's outer surface suitable to accommodate for a human hand and for providing a sufficiently safe hand-gripping for carrying the appliance around, in such a manner that only one hand is required to hold and carry the appliance.

BRIEF DESCRIPTION OF THE DRAWINGS

The invention will now be described with reference to the schematic drawings, wherein.

DETAILED DESCRIPTION

Figure 1:
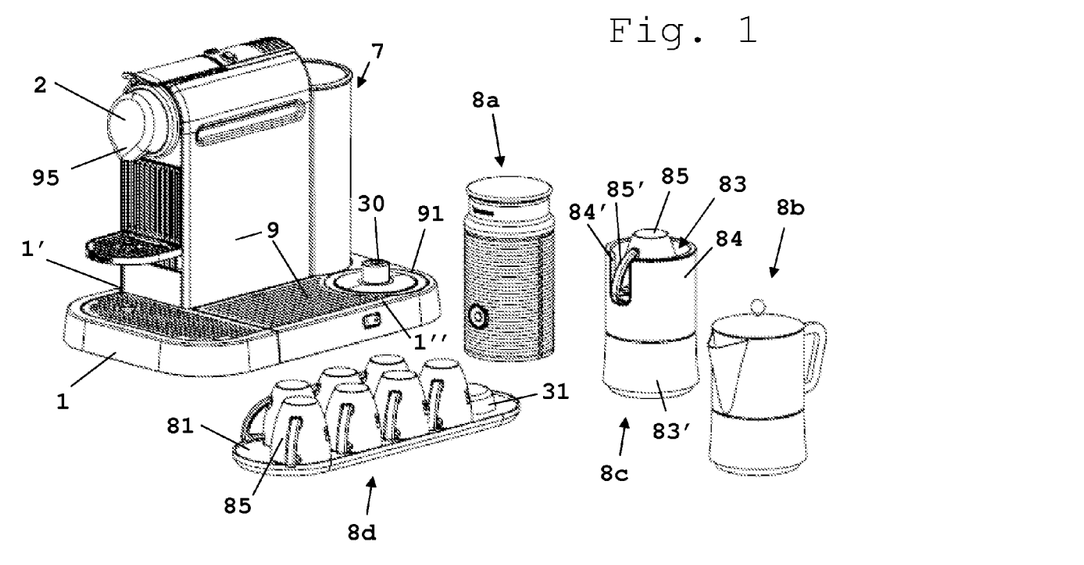
FIG. 1 illustrates a set that includes a liquid food or beverage device and various connectable appliances according to the invention.

FIG. 1 shows a set according to the invention of a device for preparing a liquid food or beverage, and a series of appliance 8a, 8b, 8c, 8d. The device has an outermost housing 9 with faces that are arranged to shield at least part of a liquid food or beverage module 2 arranged for receiving an ingredient and feeding a liquid to the ingredient. One of the faces 91 of the housing 9 has means 30, in the form of a STRIX connector, for connection to any one of appliances 8a, 8b, 8c, 8d, 8e, 8f via a corresponding connector 31,31' of such appliances.

Such disconnectable connectors for the beverage or liquid food device and the mountable appliances are for example disclosed in greater detail in WO 03/075629 and in PCT/EP08/056,349, the contents of which are hereby incorporated by way of reference.

The housing face 91 with connector 30 is generally planar and horizontally arranged so as to support mechanically such an appliance 8a, 8b, 8c, 8d, 8e, 8f. Moreover, the connection means 30 is disconnectably connectable by a user to such an appliance. Housing 9 and appliances 8a, 8b, 8c, 8d, 8e, 8f are so arranged that any such appliance is removably mountable onto such housing face 91 by a user. Hence a user can easily interchange such appliances or, when applicable, remove them for dispensing their content.

Various appliances may be mounted onto face 91 with connector 30, such as a milk frothing appliance 8a, a kettle 8b, a single cup heater 8c or a single level multi-cup heater 8d,8f or a multi-level multi-cup heater 8e.

Such appliances 8a, 8b, 8c, 8d, 8e, 8f are functionally independent from module 2. In other words, module 2 does not require a contribution from appliances 8a, 8b, 8c, 8d, 8e, 8f to perform its beverage or liquid food function and vice versa. However, certain liquid food or beverage preparations may require a combination of constituents prepared on the one hand with the module 2 of the liquid food and beverage preparation device and on the other hand with an appliance 8a that is mountable on face 91 and connecter 30.

For example, a cappuccino can be prepared by frothing milk in milk frothing appliance 8a, removing frother 8a from face 91 and pouring frothed milk into a cup 85 and then placing cup 85 with frothed milk under a coffee outlet 95 of module 2 and dispensing a coffee therefrom. The removal, pouring and cup placing steps would typically be carried out by a user. However, neither module 2 nor appliance 8a require each other to perform their respective beverage preparation functions. Details of a suitable frothing system are for example disclosed in the above mentioned WO 03/075629 and in PCT/EP08/056,349, which are hereby incorporated by way of reference.

It is nevertheless possible, depending on the type of appliance used, in particular an appliance that requires a significant amount of energy to operate, that the combination of module 2 and such an appliance require a power management arrangement that allocates a limited available power, typically from the mains. But even in such a case, the respective functions of the appliances are distinct.

Figure 3:
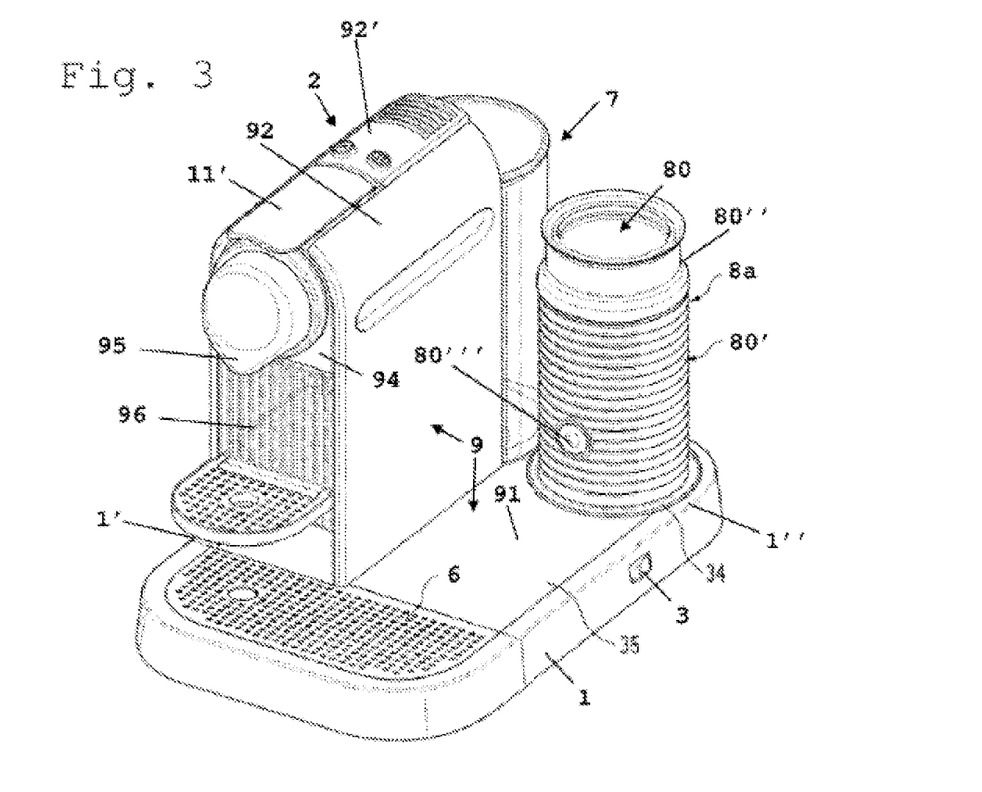
FIG. 3 illustrates a liquid food or beverage device with a milk frothing appliance according to the invention.
Figure 4:
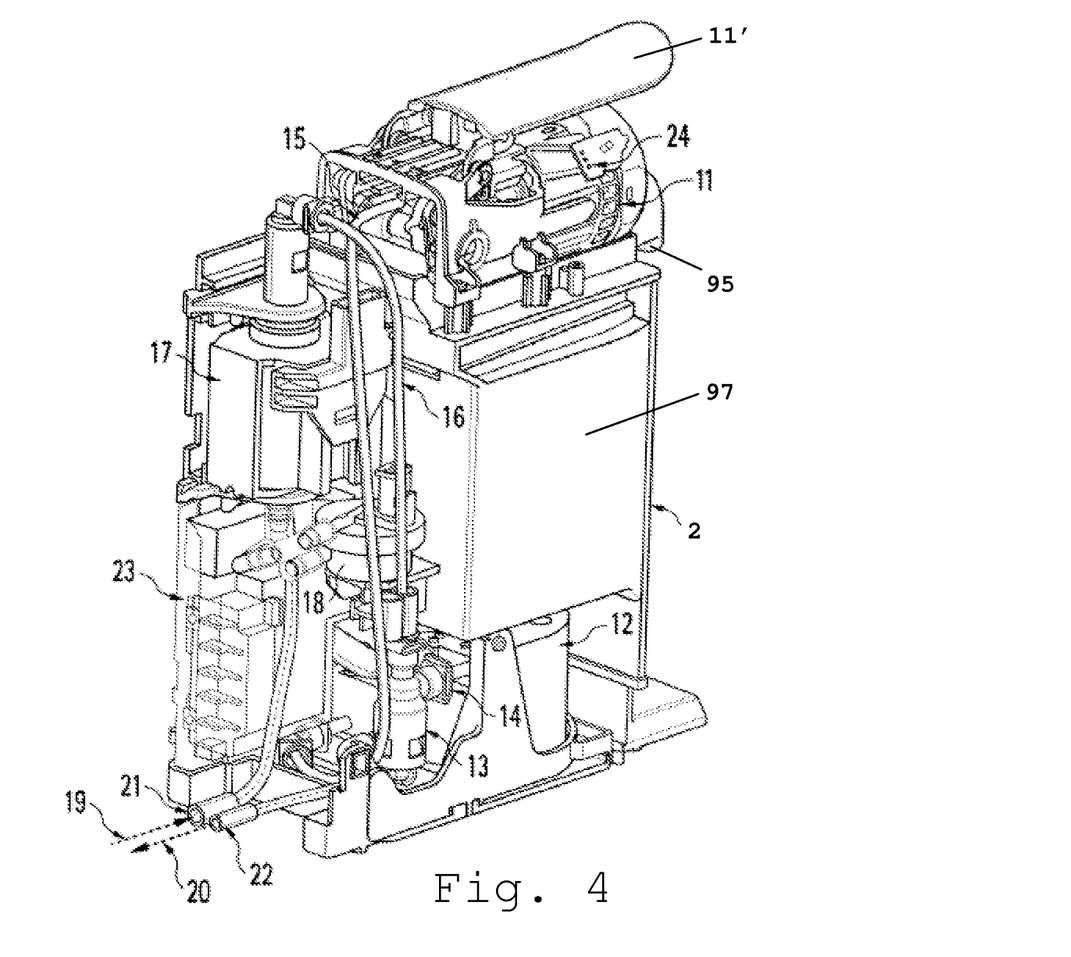
FIG. 4 shows a liquid food or beverage module of a device according to the invention.

As can be seen in FIG. 1 and in greater detail in FIG. 3, housing 9 has a foot part forming a platform 1 that bears housing face 91 with connector 30. Part of module 2 extends into platform 1, in particular the fluid connection to a water reservoir 7 placed on a rear part of platform 1, as shown in FIG. 4. A drip tray 6 is assembled to the front part of platform 1. The liquid food or beverage module 2 generally extends upwards within housing 9 adjacent a first lateral edge 1' of platform 1 and housing face 91 is generally located adjacent a second lateral edge of platform 1 opposite the first edge 1", so that housing 9 generally forms an L-shape in cross-section.

In a variation it is also possible to provide a housing with a generally inverted T-shaped cross-section with the liquid food or beverage module extending upwards from a middle part of the platform. In this case, it is also possible to provide a connector on each side of the inverted T-shaped liquid food or beverage device so that two appliances may be mounted and connected simultaneously to the device, one on each side of the module.

Liquid food or beverage module 2 (shown in greater detail FIG. 4) is enclosed in housing 9 with downwardly extending sidewalls 92 that are mounted on platform 1. Sidewalls 92 are generally vertical and parallel and cover substantially the entire upper part of liquid food or beverage module 2. Sidewalls 92 cooperate with a top part 92', a front wall 94, a rear wall facing wall 94 and a platform 1 to form outermost housing 9. Front wall 94 is associated with a beverage outlet 95 for dispensing beverage from module 2 and which extends through housing 9. Outlet 95 is located above a drip tray device 6. Furthermore, housing 9 houses capsule receptacle 96 that is removably inserted under outlet 95.

Platform 1 has at least the minimal functions as to the fluid and power management, which is supplying the liquid food or beverage module 2 with electrical power and with water from water tank 7 attached to the base platform externally to housing 9 and adjacent to the rear wall of housing 9. Moreover, tank 7 has a semi-circular upright wall 71 with extremities that are generally flush with sidewalls 92 of housing 9.

Platform 1 according to this example is provided with an integrated electrical circuitry to be connected to the mains. A master switch 3 is provided for switching the machine on and off including connector 30 for powering a connectable appliance 8a, 8b, 8c, 8d, 8e, 8f.

Additionally, the shown platform is provided with water feed lines connecting the water tank 7 with a fluid connector arranged at the top surface of platform 1.

As illustrated in FIG. 3, an appliance in the form of a milk frother 8a may be removably mounted onto housing 9 of the liquid food or beverage device.

Milk frother 8a has a container 80" that holds an upper tank 80 for containing milk to be frothed and, below tank 80, a lower cavity (not shown) that contains the electric parts, in particular an actuator, of frother 8a. A user-switch 80''' extends through an upright wall 80' of container 80" for controlling the heating, cooling and/or actuator of the milk agitator of frother 8a. Further details of these parts are disclosed in the abovementioned WO 03/075629 and in PCT/EP08/056,349 as well as in WO 2008/046837, which are hereby incorporated by way of reference.

Milk frother 8a is handle-free but is holdable and liftable single-handed. In particular, an upright wall of container 80" has a textured outer surface 80' to improve hand-holding thereof, in particular a corrugated or undulated upright surface 80'. The presence in surface 80' of generally horizontally extending parallel, alternating ridges and grooves improves the gripping of the appliance for lifting, holding and manipulation thereof. To allow comfortable holding, single-handed, of the appliance, the diameter of the gripping part may be of the order of 8 to 10 cm.

Housing face 91 may have a first portion 34 for holding an appliance, such as a frother 8a or a kettle 8b, and an adjacent portion 35 that is optionally associated with a heating system, in particular integrated with housing 9, arranged to support one or more cups 85 for pre-heating thereof.

In a variation, portion 35 may bear a second connector for connection to a second appliance so that two appliances can be mounted simultaneously directly onto face 91 and perform their respective functions at the same time. For example, a milk frother 8a may be connected to a first connector and a cup heater 8c can be connected to a second connector.

Figure 2A:
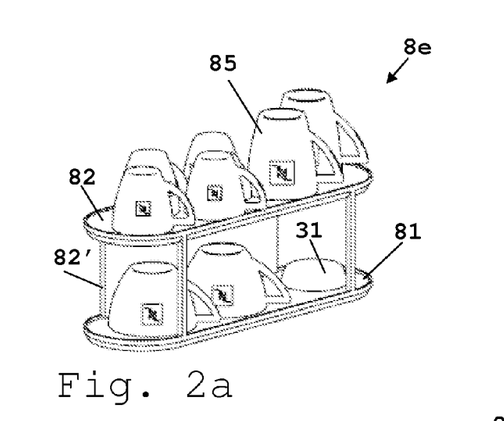
FIGS. 2a and 2b show two cup heaters according to the invention.
Figure 2B:
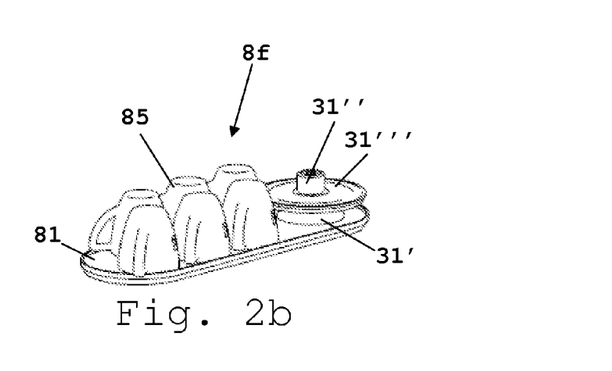

FIGS. 2a and 2b illustrate two cup heaters 8e and 8f that have a cordless connector 31,31' for connection to connector 30 of housing face 91 of the beverage or liquid food device.

Cup heater 8e has a pair of staked horizontal heating trays 81,82 vertically spaced apart by upright spacers 82'. The spacing between the heating trays 81,82 is sufficient for cups 85 to be placed therebetween. Each tray may be associated with a heater, in particular a resistive heater. The heaters may be electrically interconnected and/or individually activatable for heating cups 85 that rest on the lower tray 81 or the upper tray 82. A connector 31 for connection to connector 30 of the liquid food or beverage device is provided at one end of lower heating tray 81. Heating tray 81 has such dimensions to fit onto the housing face 91. In particular lower heating tray 81 will be allowed to rest on the front portion 35 of face 91, in which case this portion will not need to be heated separately to pre-heat cups.

Cup heater 8f has only one horizontal heating tray 81 for supporting and pre-heating cups 85. Heating tray 81 is associated with two connectors 31',31". First connector 31' is downwardly oriented and arranged to fit connector 30 of the liquid food or beverage device. Second connector 31" is upwardly oriented. This connector 31" is associated with support member 31''', for example generally shaped as a horizontal disc, and can be substantially identical in shape and function to connector 30 and portion 34 of housing face 91 of the liquid food and beverage device. Hence, a second appliance, such as a frother 8a or kettle 8b can be mounted onto connector 31" and support disc 31''' of cup heater 8f. Cup heater 8f is a variation of cup heater 8d that includes only one connector 31.

FIG. 1 shows a fourth cup heater 8c which, unlike heaters 8d, 8e, 8f, is arranged for preheating one cup 85 at a time. Cup heater 8c has an upper seat 83 for holding a cup 85 and a base 83' that contains a heating control arrangement and a connector in its bottom surface that can be connected to connector 30 of the liquid food or beverage device. Seat 83 has a generally circular peripheral upright wall 84 for confining heat against cup 85. Moreover, peripheral wall 84 has a vertically extending through-opening 84' for allowing the passage of a handle 85' of cup 85 so as to facilitate upon pre-heating seizure and removal of cup 85 from seat 83 by giving access to handle 85'. By allowing handle 85' stick out from pre-heating seat 83 via opening 84', pre-heating is concentrated on the container part of cup 85 and not on the handle 85' which may remain at a lower temperature comfortable for hand seizure.

In FIG. 4 is illustrated part of an inside view of a liquid food or beverage device of the invention, for instance as illustrated in FIGS. 1 and 3, in particular the liquid food or beverage module 2 located in an outermost housing 9 (not shown).

Module 2 includes a brewing unit 11 that comprises an opening and closure handle 11' and means for holding a substance-containing capsule, e.g., a coffee capsule, and beverage delivery means such as a beverage duct 95.

The holding means typically comprises a capsule holder and brewing cage, a fluid injection system for injecting water in the capsule and a closure device such as a lever and a knee joint mechanism. Suitable extraction modules are described in EP 1 859 713.

A water heater such as a thermo-block 12 or similar thermal bloc inertia-type heaters is provided in module 2. The water heater is connected to the brewing unit 11 via a priming valve 13 and soft tubular lines 14, 15. For ease of connection, clipping means may be used to connect the tubular lines to the different elements.

A pressure pump 17 is provided to supply water to the water heater at a high pressure. Therefore, the pressure pump is associated to the water heater by means of a soft tubular line 16. The pump can be a piston pump. A flow meter 18 is also provided upstream the pump to count the volume of water sucked by the pump and distributed to the water heater, and therefore to enable a precise beverage volume management. Water line 19 represents the cold water entering the water connection entry 21 and leading to the flow meter 18. Water line 20 represents the cold water line exiting the water connection exit 22 coming from the priming valve 13. This line 20 is to balance the pressure in the fluid circuit by purging air and/or water during the priming operation of the system. The valve is described in greater details in EP 1 798 457.

Water lines 19, 20 and priming valve 13 extend into the foot or platform 1 of housing 9 of the liquid food or beverage device.

An electronic circuitry 23 is also disposed in module 2 to control the different elements thereof, in particular, the water heater, the pump and the flow meter.

One or two button prints 24 are also placed on the side of the module which are electronically connected to the electronic circuitry 23. These are known per se and may typically be soft pads enabling to open/close the electronic circuit for running the pump. Each print 24 may serve for a programmed volume of water to be pumped corresponding to a beverage size, e.g., a short espresso coffee of 40 mL or a long coffee cup of 110 mL.

As illustrated, liquid food or beverage module 2 is tightly arranged around inner housing 97 for receiving the used capsule receptacle 96 (not shown).

Figure 5:
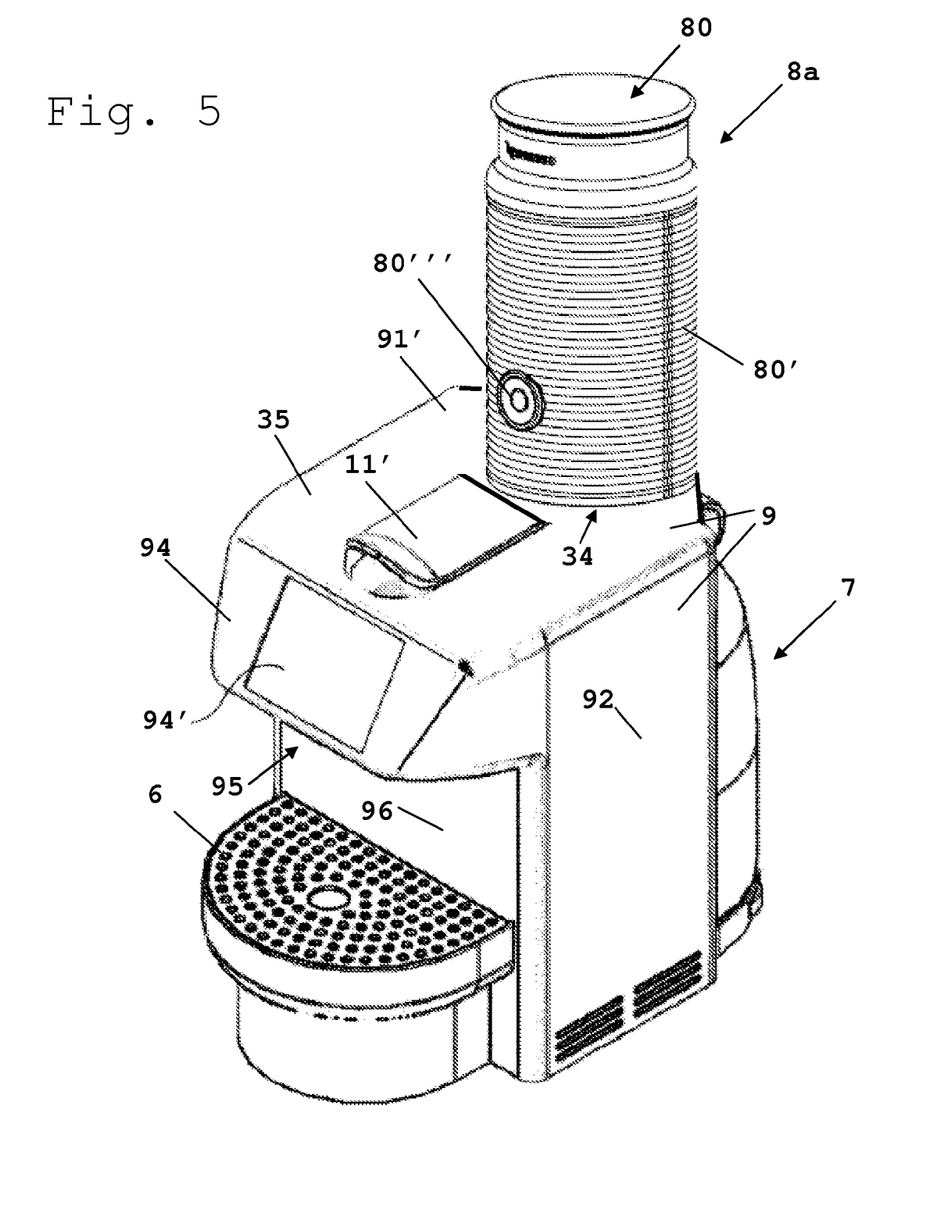
FIG. 5 illustrates another liquid food or beverage device with a milk frothing appliance according to the invention.

The liquid food and beverage machine shown in FIG. 5, in which the same numeric references generally designate the same elements, is similar to the one shown in FIGS. 1 and 3.

However, housing 9 shown in FIG. 5 has its housing face 91' with a connector (not shown) disconnectably connectable to an appliance 8a, 8b, 8c, 8d, 8e, 8f of the type discussed in relation with FIGS. 1 to 3, above the liquid food or beverage module with handle 11'. As can be seen in FIG. 5, housing 9 does not have a lateral bottom extension forming a foot of platform, unlike in the illustrations of FIGS. 1 and 3.

Like in the previous embodiments, housing face 91' has a rear part 34 supporting an appliance, in particular a milk frothing appliance 8a, and a front part 35 for supporting cups 85. Front part 35 may also incorporate a heating system, for instance a resistive heating arrangement optionally linked to a thermoblock or other heating means for heating a fluid within the liquid food or beverage module, for pre-heating cups resting on front part 35.

For operating the liquid food or beverage device shown in FIG. 5, its front face 94 bears a touch screen interface 94'. Milk frother 8a may be controlled separately via control button 80'''.

What is claimed is:

1. A liquid food or beverage device that prepares a liquid food or beverage from a pre-portioned beverage or food ingredient comprising an outermost device housing having faces that are arranged to shield at least part of a liquid food or beverage module that is contained therein, wherein the module comprises a brewing unit that includes an opening/closure handle and a holder for holding a beverage or food ingredient-containing capsule and a brewing cage, and the module further comprises a liquid injection system and a beverage outlet for preparing a beverage from a pre-portioned beverage or food ingredient and dispensing the beverage from the module, wherein the module is arranged in the housing for receiving an ingredient and feeding a liquid to the ingredient, with one of the faces being a planar and horizontal housing face having means for cordless electrical connection to a functionally independent appliance that provides a feature that enhances the liquid food or beverage that is prepared, wherein the housing face having the connection means is arranged to mechanically support the appliance positioned upon it, and the appliance is electrically disconnectably connectable to the housing face by the cordless connection means, wherein the cordless connection means comprises a first connector directly connected to the housing face and a second connector associated with the appliance, wherein the first and second connectors are operatively associated to connect together in electrical communication so that the housing provides electrical power to the appliance, whereby the housing is so arranged that the appliance is removably mountable onto the housing face of the device.

2. The device of claim 1, wherein the cordless connection means comprises connector pins which extend through an opening or passage in the appliance bottom for establishing electrical contact between the appliance and the housing.

3. The device of claim 1, wherein the connection means comprises a plug and socket connection.

4. The device of claim 1, wherein the housing has a foot part forming a platform that bears the housing face having the connection means.

5. The device of claim 4, wherein the liquid food or beverage module generally extends upwards adjacent a first edge of the platform and the housing face with the connection means is generally located adjacent a second edge of the platform.

6. The device of claim 1, wherein the housing has a top part forming the face having the connection means.

7. A liquid food or beverage device that prepares a liquid food or beverage from a pre-portioned beverage or food ingredient comprising:
   a liquid food or beverage module arranged for receiving an ingredient and feeding a liquid to the ingredient, wherein the module comprises a brewing unit that includes an opening/closure handle and a holder for holding a beverage or food ingredient-containing capsule and a brewing cage, and the module further comprises a liquid injection system and a beverage outlet for preparing a beverage from a pre-portioned beverage or food ingredient and dispensing the beverage from the module, wherein the module comprises:

an outermost housing having faces that are arranged to shield at least part of the liquid food or beverage module that is contained in the housing, with one of the faces being a planar and horizontal housing face having means for cordless electrical connection to an appliance that provides a feature that enhances the liquid food or beverage that is prepared, wherein the housing face having the connection means is arranged to mechanically support the appliance positioned upon it, and the appliance is electrically disconnectably connectable to the housing face by the cordless connection means, wherein the cordless connection means comprises a first connector directly connected to the housing face and a second connector associated with the appliance, wherein the first and second connectors are operatively associated to connect together in electrical communication such that the housing provides electrical power to the appliance, whereby the housing is so arranged that the appliance is removably mountable onto the housing face, and wherein the appliance is selected from a milk frother having heating means therein and a cup heater having a resistive heater therein and either appliance is operable and functionally independent from the liquid food or beverage module.

8. The device of claim 7, wherein the appliance is a handleless milk frother that has a tank for containing milk to be frothed and an outer generally upright surface forming a grip arrangement configured and dimensioned to be capable of seizure by an adult human hand, such that the appliance can be carried and displaced single handed by seizure of the grip arrangement.

9. The device of claim 8, wherein the grip arrangement comprises an outer surface having a textured outer upright wall or an undulated or corrugated upright wall to improve hand-holding of the grip arrangement.

10. The device of claim 8, wherein the housing face having connection means supports a first removable appliance that has a first connector that is disconnectably connected to the connection means of the face; and a second connector that is disconnectably connectable to a second appliance.

11. The device of claim 10 wherein the first removable appliance is a cup heater having a resistive heater therein and the second appliance is a milk frother or kettle having heating means therein, with the second appliance being electrically disconnectably connectable directly to the second connector of the first removable appliance.

12. The device of claim 1, wherein the face has a first portion for supporting the appliance and a second portion that is arranged for supporting one or more cups and that include electrical resistive cup preheating means.

13. A set comprising a liquid food or beverage device and a plurality of different appliances including at least a milk frother having heating means therein and a cup heater having a resistive heater therein, wherein the device comprises an outermost device housing having faces that are arranged to shield at least part of a liquid food or beverage module that is contained therein, wherein the module comprises a brewing unit that includes an opening/closure handle and a holder for holding a beverage or food ingredient-containing capsule and a brewing cage, and the module further comprises a liquid injection system and a beverage outlet for preparing a beverage from a pre-portioned beverage or food ingredient and dispensing the beverage from the module, wherein the module is arranged in the housing for receiving an ingredient and feeding a liquid to the ingredient, with one of the faces being a planar and horizontal housing face having means for cordless electrical connection to a functionally independent appliance that provides a feature that enhances the liquid food or beverage that is prepared, wherein the housing face having the connection means is arranged to mechanically support the appliance positioned upon it, and the appliance is electrically disconnectably connectable to the housing face by the cordless connection means, wherein the cordless connection means comprises a first connector directly connected to the housing face and a second connector associated with the appliance, wherein the first and second connectors are operatively associated to connect together in electrical communication so that the housing provides electrical power to the appliance, whereby the housing is so arranged that the appliance is removably mountable onto the housing face of the device; and wherein the different appliances are electrically disconnectably connectable to the connection means.

14. The device as defined in claim 1, wherein the appliance is a cup heater having a resistive heater therein.

15. The device of claim 14, wherein the cup heater has at least one heatable platform or a plurality of stacked heatable platforms for holding and heating a plurality of cups, with the stacked platforms optionally electrically interconnected or individually activatable for heating the cups.

16. The device of claim 14, wherein the cup heater has a seat for holding a cup, the seat having at least one peripheral wall for confining heat against the cup, and the peripheral wall optionally has an opening for allowing the passage of a cup handle.

17. The device of claim 1, wherein the appliance is a milk frothing appliance having heating means therein and having a tank for containing milk to be frothed, with the appliance being handleless and having an outer generally upright surface that forms a grip arrangement seizable by a human hand, such that the appliance can be carried and displaced single handed by seizure of the grip arrangement.

18. The device of claim 17, wherein the upright surface has a portion that is textured or striated or that has a generally upright corrugation or undulation to facilitate hand gripping.

* * * * *